United States Patent
Kang

(10) Patent No.: US 7,236,868 B2
(45) Date of Patent: Jun. 26, 2007

(54) APPARATUS FOR MONITORING OPERATOR VIBRATION FOR EARTH MOVING MACHINERY WITH OPERATION CAB

(75) Inventor: Jong Min Kang, Kimhae (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 11/481,620

(22) Filed: Jul. 6, 2006

(65) Prior Publication Data

US 2007/0038354 A1    Feb. 15, 2007

(30) Foreign Application Priority Data

Aug. 11, 2005    (KR) .................. 10-2005-0073764

(51) Int. Cl.
   *G06F 7/70*    (2006.01)
(52) U.S. Cl. ..................... 701/50; 180/89.12
(58) Field of Classification Search ............. 701/1, 701/36–50; 73/1.37–1.4; 180/89.12–89.14
   See application file for complete search history.

(56) References Cited

U.S. PATENT DOCUMENTS 5,536,059 A * 7/1996 Amirouche ............ 296/65.02
5,785,803 A * 7/1998 Schiessl ................ 156/538
5,908,456 A * 6/1999 Wahlers ................. 701/37

* cited by examiner

*Primary Examiner*—Richard M. Camby
(74) *Attorney, Agent, or Firm*—Ladas and Parry LLP

(57) ABSTRACT

An apparatus for monitoring an operator vibration for an earth moving machinery with an operation cab is disclosed. In an earth moving machinery having an operation seat in an interior of an operation cab installed at an upper frame of a lower running body, there is provided an apparatus for monitoring an operator vibration for an earth moving machinery with an operation cab which comprises an operation seat which is installed in an interior of the operation cab and which includes an acceleration sensor for sensing and converting vibration into a 3-axis channel signal; a vibration measuring device which is installed in a lower side of the operation cab and which measures a 3-axis channel vibration in real time by receiving the 3-axis channel signal and outputs an 3-axis vibration value based on the measured vibration; an electronic control unit which is installed between the operation seat and the vibration measuring device and which computes a mean vibration value and an impact vibration value generated in a predetermined time interval by receiving the 3-axis vibration value and outputs vibrations of ELV; and a display device which is installed in an interior of the operation cab and which displays the ELV on a LCD screen in real time, so that an operator easily monitors the ELV through the LCD screen.

2 Claims, 5 Drawing Sheets

Cumulated RMS (10 division)

| | | |
|---|---|---|
| 0.0141 | 0.04812 | 0.03444 |
| 0.1794 | 0.099   | 0.2677  |
| 0.2735 | 0.1233  | 0.4147  |
| 0.2741 | 0.1205  | 0.4028  |
| 0.2825 | 0.1287  | 0.394   |
| 0.3017 | 0.1523  | 0.4203  |
| 0.3136 | 0.169   | 0.4323  |
| 0.3348 | 0.1788  | 0.455   |
| 0.3364 | 0.1746  | 0.4545  |
| 0.321  | 0.1667  | 0.4322  |

APPARATUS FOR MONITORING OPERATOR VIBRATION FOR EARTH MOVING MACHINERY WITH OPERATION CAB

BACKGROUND OF THE INVENTION

1. Field of the Invention

The present invention relates to an apparatus for monitoring an operator vibration for an earth moving machinery with an operation cab, and in particular to an apparatus for monitoring an operator vibration for an earth moving machinery with an operation cab in which a safe operation of an earth moving machinery is achieved in such a manner that a vibration occurring during an operation of an earth moving machinery is monitored, and an exposure state of an operator with respect to vibration is provided in real time, so that an operator is provided with a certain alarm.

2. Description of the Background Art

In a work operation of a common earth moving machinery such as an excavator, a hydraulic shovel, etc., an earth surface condition is bad at a construction site or a civil construction site, so that vibrations are generated. An operator of an earth moving machinery, who operates various operation levers or other devices in an operation cab, is exposed to vibrations.

The ELV (Exposure Limit Value) of an operation with respect to vibrations is regulated with an earth moving machinery standards such as EU standards for an earth moving machinery and is increasingly complied with the substantial requirements for manufacturing an earth moving machinery in many countries.

An operator during an operation of an earth moving machinery is substantially exposed to the ELV based on an average work time (8-hours) per day at least. It is needed to design and equip with a device for recording and providing vibrations of a exposure limit value including a WBV (Whole Body Vibration) applied to an operator body and a HAV (Hand Arm Vibration) applied to an operator arm during a manufacture of an earth moving machinery, so that an operator is protected from being exposed to long time vibrations and impacts.

Thus, a conventional earth moving machinery is designed to first protect vibrations and impacts transferred to an operator from an earth moving machinery by attaching an anti-vibration rubber at a contact portion between a lower running body having an upper frame and an operation cab as a vibration and impact absorption device or by attaching a damper at a lower part of an operation seat, thereby satisfying the standards of the EU or a requirement thereof.

Since the vibrations and impacts cannot be fully protected with a damper having a simple damping function, the operator may be provided with more fatigue. In particular, during a long time operation of the machinery, since the ELV applied to the operator body and the ELV applied to the operator arm or arm muscles cannot be measured and monitored, an unexpected inveterate disease may occur at an operator's body due to exposure the ELV of vibrations and impacts from the earth moving machinery.

Also, since the ELV from the earth moving machinery changes based on the surface condition of the work site or the operation time of the operator, it is not practical to simply standardize and monitor the work time and work site indication when setting only the ELV of the earth moving machinery. It is needed to provide an operator with vibration state of the earth moving machinery when the ELV reaches the limit value of the ELV in real time based on the current working operation.

SUMMARY OF THE INVENTION

Accordingly, it is an object of the present invention to provide an apparatus for monitoring an operator vibration for an earth moving machinery with an operation cab which measures and monitors an exposure limit value (ELV) applied to an operator body or an operator arm or arm muscle in real time.

It is another object of the present invention to provide an apparatus for monitoring an operator vibration for an earth moving machinery with an operation cab which is capable of providing an alarm to an operator in real time when an ELV reach a limit value of an ELV based on a current working operation.

In the descriptions of the present invention, a root mean square (RMS) represents a mean vibration value which processes a vibration measured from an operation seat based on a predetermined set algorithm by an electronic control unit, and a vibration dose value (VDV) represents an impact vibration value which processes a vibration measured from an operation seat based on a predetermined set algorithm and includes the pick maximum amplitude by the electronic control unit, and A(T) represents a mean vibration value which processes a vibration measured from the operation seat at a time terminal T based on a predetermined set algorithm by a computation device.

In the descriptions of the present invention, the ELV of the operator body is a vibration displayed in a WBV value, and the ELV of the operator arm is a vibration displayed in a HAV value. It may be represented to interpret that the above ELV includes an accumulated value of the mean vibration and an accumulated value of the impact vibration to be displayed during time interval T so that the mean vibration value A(T) or the impact vibration value VDV(T) is monitored by a predetermined range of the ELV measured at every dT time from during a time interval T, thereby complying with the standards stipulated in each country.

To achieve the above objects, in an earth moving machinery having an operation seat in an interior of an operation cab installed at an upper frame of a lower running body, there is provided an apparatus for monitoring an operator vibration for an earth moving machinery with an operation cab which comprises an operation seat which is installed in an interior of the operation cab and which includes an acceleration sensor for sensing and converting vibration into a 3-axis channel signal; a vibration measuring device which is installed in a lower side of the operation cab and which measures a 3-axis channel vibration in real time by receiving the 3-axis channel signal and outputs an 3-axis vibration value based on the measured vibration; an electronic control unit which is installed between the operation seat and the vibration measuring device and which computes a mean vibration value and an impact vibration value generated in a predetermined time interval by receiving the 3-axis vibration value and outputs vibrations of ELV; and a display device which is installed in an interior of the operation cab and which displays the ELV on a LCD screen in real time, so that an operator easily monitors the ELV through the LCD screen.

The acceleration sensor may be installed at a lower part of an operation seat or an arm rest of the same, and the electronic control unit may include an output device for judging a predetermined range of a 3-axis vibration value of an operation seat based on an input signal from the acceleration sensor for generating a control signal.

There is further provided an alarm device for providing an operator of an alarm when a control signal received from the electronic control unit exceeds a predetermined range of the ELV.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be described with reference to the accompanying drawings.

Figure 1:
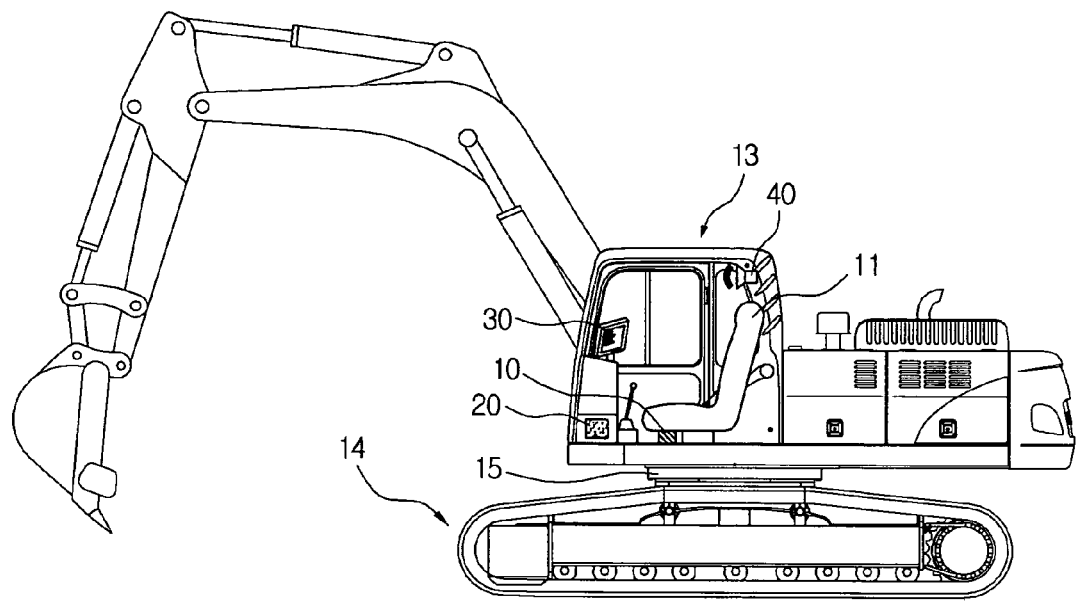
FIG. 1 is a view illustrating an arranged state of important elements of an apparatus according to the present invention.
Figure 2:
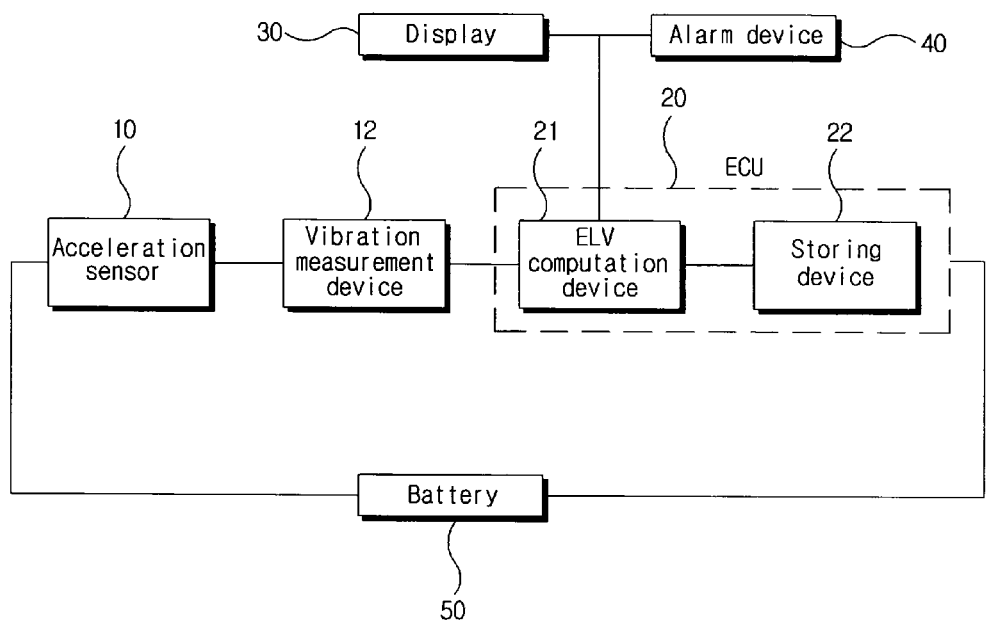
FIG. 2 is a block diagram illustrating a circuit for operating an apparatus according to the present invention.

FIG. 1 is a view illustrating an arranged state of important elements of an apparatus according to the present invention, and FIG. 2 is a block diagram illustrating a circuit for operating an apparatus according to the present invention.

The apparatus for monitoring an operator vibration for an earth moving machinery with an operation cab according to the present invention comprises an acceleration sensor 10 which is installed at a lower part of an operation seat 11 provided in the interior of an operation cab 13

While the operation cab 13 is installed at an upper frame 15 of a lower running body 14, the acceleration sensor 10 generates a 3-axis channel low frequency signal by sensing and converting a vibration from the operation cab 13 to the operation seat 11. The 3-axis channel signal of the acceleration sensor 10 is generated in a low frequency of vibration during operation of an earth moving machinery.

The vibration measurement device 12 is installed at a lower side of the operation cab receives the 3-axis channel signal and measures the vibration of the 3-axis channel signal in real time and outputs a 3-axis vibration value.

An electronic control unit 20 is installed between the operation seat and the vibration measuring device and which receives the 3-axis vibration value of the vibration measurement device 12 and computes the mean vibration value and the mean impact vibration value which are generated at a predetermined time interval.

A result of the computation, the electronic control unit 20 outputs an ELV, as an exposure limit value of a vibration state for an operation cab 13 or an earth moving machinery.

A display device 30 is installed at an inner one side of the operation cab 13 and display the ELV on a LCD screen in real time, thereby allowing an operator to easily view or monitor the ELV through the LCD screen.

Here, the electronic control unit 20 comprises a computation device 21 for computing a mean vibration value and an impact vibration value, and a storing device 22 such as a microcomputer, etc. for storing a result of the computation. The storing device 22 stores a control signal such as a mean exposure limit value per day, for example, in case of an operator during an operation of an earth moving machinery is substantially exposed to the ELV based on at least an 8-hour work per day, which may be expressed with A (8), while other vibration does values (VDV) including a maximum value of the vibrations may stores and outputs on the display device 30 through the control signal.

In a preferred embodiment of the present invention, the electronic control unit 20 may be connected with an electrical control unit (ECU) for controlling an operation of an earth moving machinery, which is installed in the interior of an operation cab of the machinery such as a common excavator, a hydraulic shovel, and the display device 30 may be connected with a common meter panel.

The apparatus for monitoring an operator vibration for an earth moving machinery with an operation cab according to a preferred embodiment of the present invention computes a mean vibration value and an impact vibration value and provides a control signal for outputting an ELV based on a result of the computation. The apparatus for monitoring an operator vibration further comprises an alarm device 40 for providing an operator with an alarm when the control signal provided from the electronic control unit 20 exceeds a predetermined range of the ELV.

Namely, the alarm device 40 provides an operator with an alarm when the ELV exceeds a predetermined range of 0.5 Hz~80 Hz in the case of the WBV (Whole Body Vibration) and provides an operator with an alarm when the ELV exceeds a predetermined range of 8 Hz~800 Hz in the case of the HAV (Hand Arm Vibration). The predetermined values may be change and adapted when it is needed to set a predetermined range of the ELV based on the work sites or the kinds of the machinery, as regulated by a standard for ELV in each country.

Figure 3:
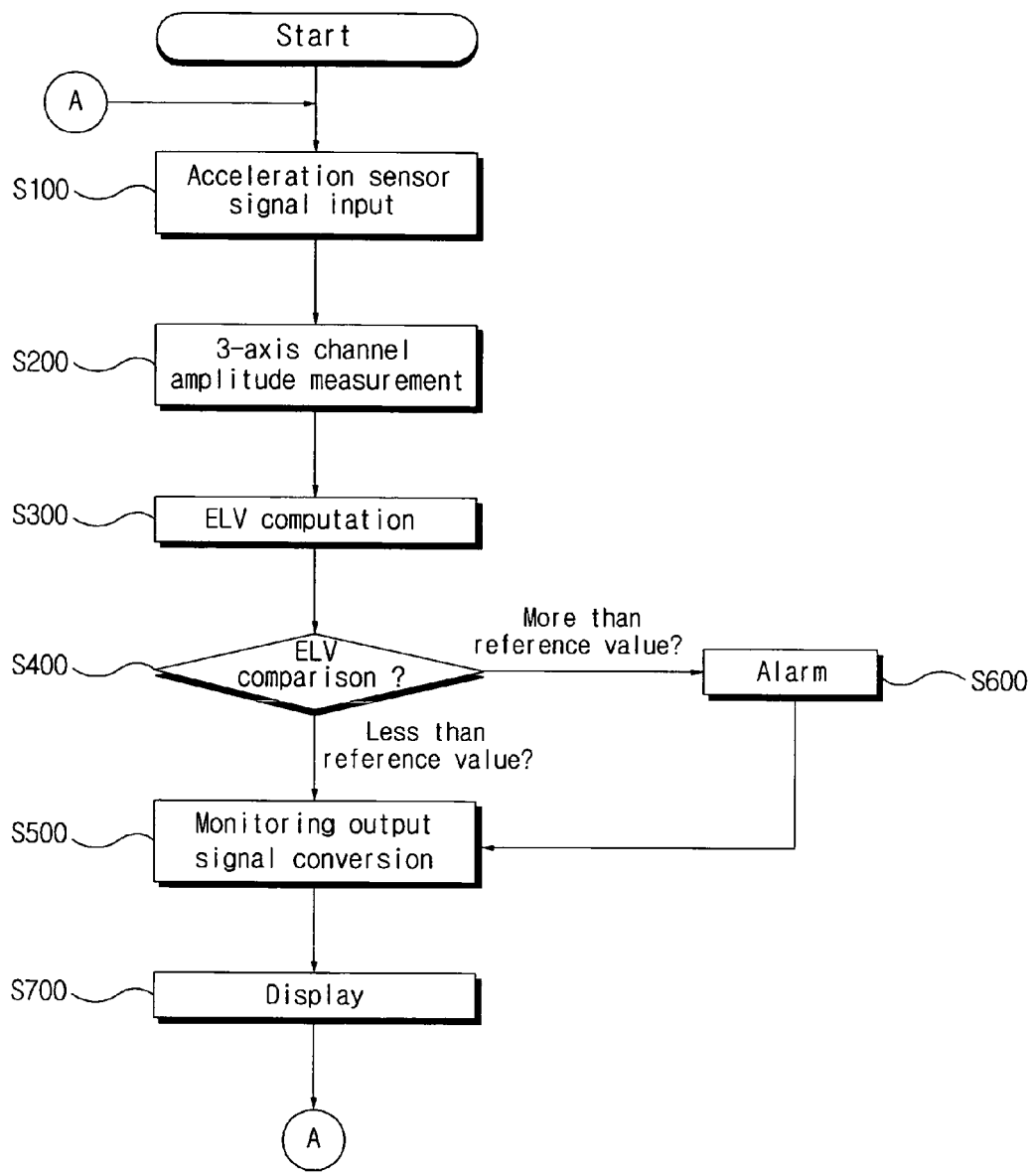
FIG. 3 is a flow chart of an operation sequence of an apparatus according to the present invention.
Figure 4:
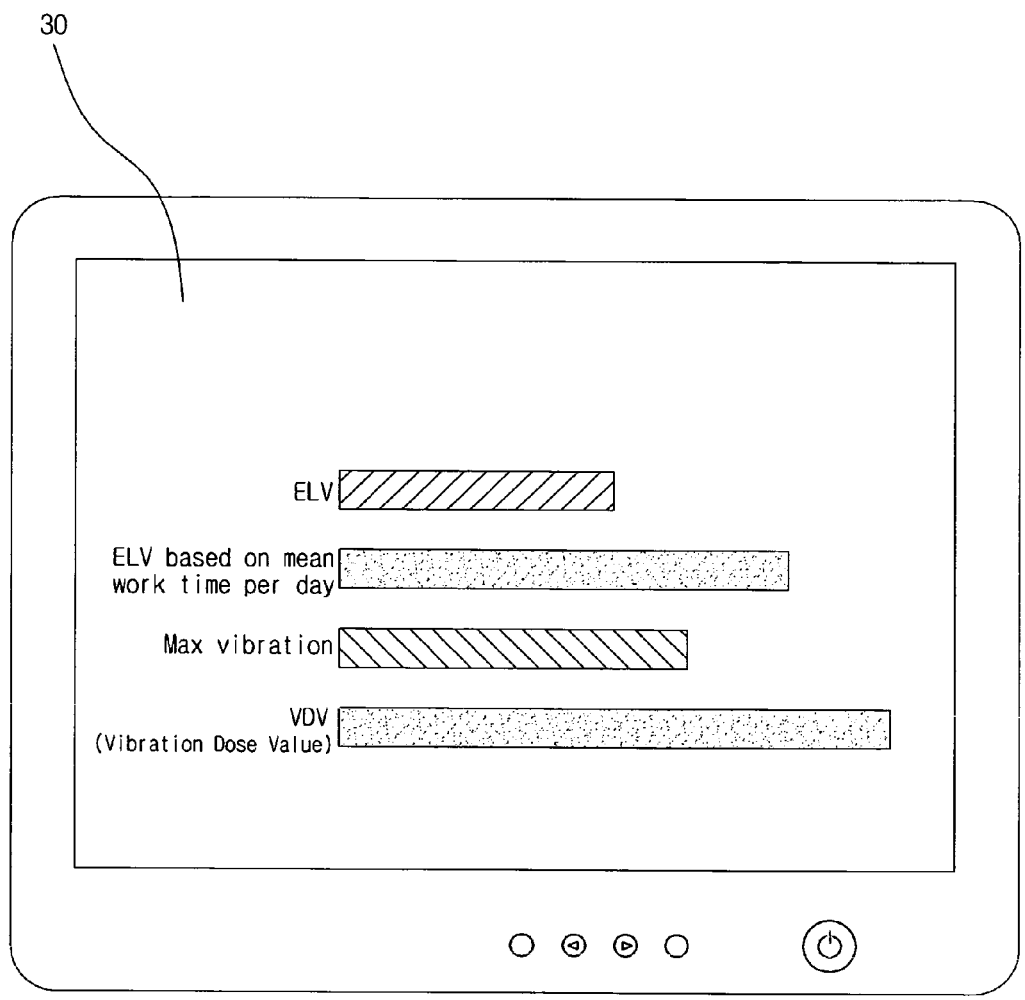
FIG. 4 is a view illustrating an monitoring display based on an average work time (8-hours) per day according to an embodiment of the present invention.

FIG. 3 is a flow chart of an operation sequence of an apparatus according to the present invention, and FIG. 4 is a view illustrating a monitoring display based on an average work time (8-hours) per day according to an embodiment of the present invention.

As shown therein, when an earth moving machinery such as an excavator or a shovel starts, the apparatus for monitoring an operation cab according to the present invention generates a 3-axis low frequency channel signal which is applied to the operation cab 11 through the acceleration sensor 10 in a step S100, and computes a 3-axis-channel-based amplitude of the operation cab 11 and provides to the electronic control unit 20 in a step S200.

Here, the above signal may be set and stored as an initial value when a certain time interval T is set by a predetermined range of vibration in the electronic control unit 20, and an operator or a user of the machinery may adjust the time interval when it is needed.

In a step S300, a VDV (Vibration dose Value) of the WBV, which includes a mean vibration value of the RMS applied to the operation seat 11, a mean vibration value of the time interval A(T) and a maximum vibration amplitude, is computed, as a ELV of vibration for an operator seated in a operation cab 13 during an working operation. In the above process, a predetermined algorithm is performed for generating an ELV of vibration receiving from an electronic control unit 20 as a display data of the WBA concerning the vibration exposure of the operator body expressed at the ELV in the display device 30 and a display data of the HAV concerning the vibration exposure of the operator arm.

The electronic control unit 20 temporarily stores a result of the data generation based on the operation of the algorithm into a storing device such as a microcomputer.

In a step S400, the ELV measured by the vibration measuring device 12 in an operation of the earth moving machinery and a predetermined range of an ELV stored in the electronic control unit 20 are compared and displayed on the display device 30 for monitoring a vibration state of an operator, as a result of the comparison.

For example, when the predetermined range of vibrations is set to 1.15 m/s, in the step S400, the ELV is compared with a predetermined range of vibration for the electronic control unit 20.

In a step S500, when the ELV of an operator during a working operation is included in the predetermined range of vibration for a working operation of an earth moving machinery, the ELV is supplied to the display device 30 with an output data for a vibration of a operation seat.

In a step S700, an accumulated vibration of the ELV in a time interval generated by the working operation of an earth moving machinery is provided in real time at a LCD screen of the display device 30 or a portion of the meter panel in real time, so that an operator or an equipment user can easily monitors a vibration exposure state outputted by the ELV on the a LCD screen.

If the ELV exceeds the predetermined range of the ELV computed in the step S400, the alarm device 40 operates in accordance with a control signal of the electronic control unit 20 in a step S600, so that an alarm is provided to an operator or an equipment user in real time. An accumulated vibration of the ELV, which is performed within a time interval concerning the vibration exposure state of an operator, is provided at the LCD screen of the display device 30 or a portion of the meter panel, so that an operator or an equipment user can see the same.

Figure 5:
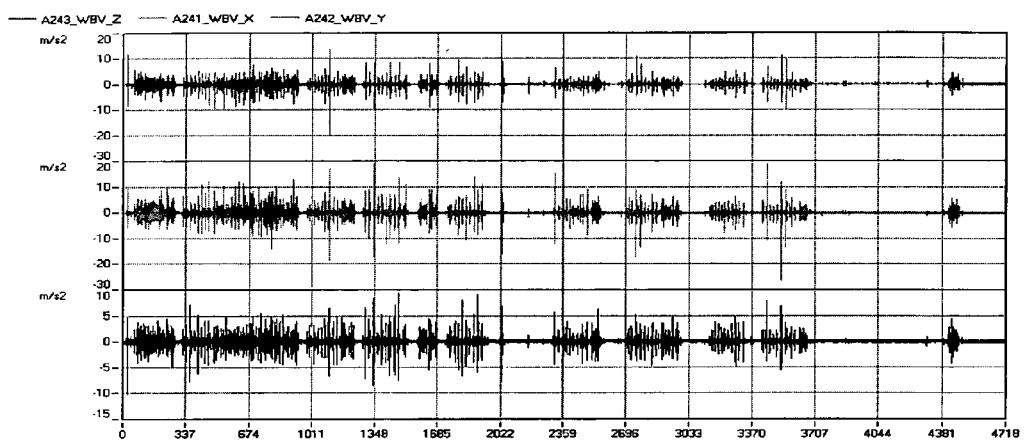
FIG. 5 is a view illustrating a display state of a mean vibration value and a measured vibration data which are computed at every 20 seconds in a display apparatus according to an embodiment of the present invention.
Figure 5:
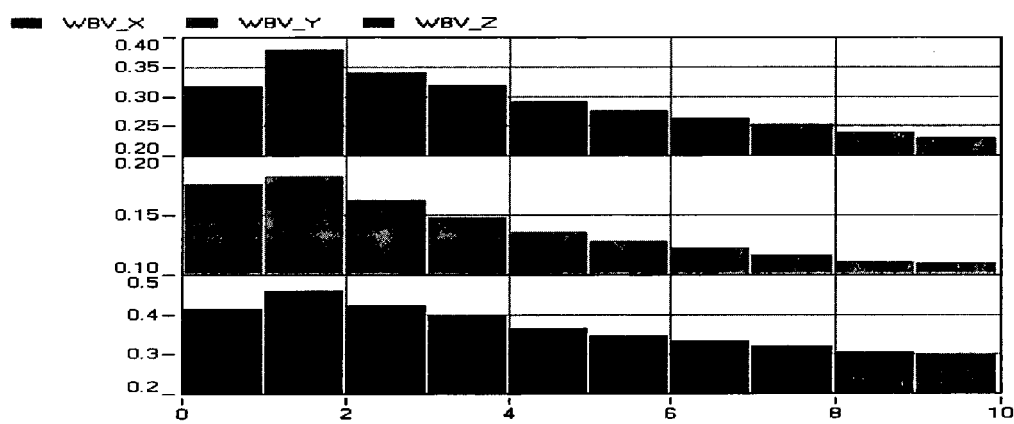

In the apparatus for monitoring an operator vibration for an earth moving machinery with an operation cab according to the present invention, the ELV applied to the operator or the operation seat of the earth moving machinery can be monitored in real time. As shown in FIGS. 4 and 5, the display device 30 according to the present invention displays a 3-axis channel vibration measured at the operation seat and, thus, a WBV value which is obtained by computing the 3-axis vibration value at every 20 seconds in a bar graph, as an ELV in the time interval.

The operator is provided with an alarm in the operation cab of the earth moving machinery when the maximum value in the 3-axis vibration value exceeds is a predetermined range during a working operation of an earth moving machinery.

In addition, as shown in FIG. 5, since an operator can be provided with vibration data based on an average work time (8-hours) per day, it is possible to achieve a safe work environment of the earth moving machinery which is largely exposed to vibrations.

FIG. 4 is a view illustrating the display state of the display device according to the present invention. As shown therein, an output signal of the ELV from the electronic control unit 20 is shown at the meter panel of a common excavator. It is obvious that adapting the above feature to the LCD devices of other earth moving machineries provided with additional display units belongs to the scope of the present invention.

As described above, in the apparatus for monitoring an operator vibration for an earth moving machinery with an operation cab according to the present invention, it is possible to measure and monitor the ELV applied to an operator body and the vibration values of the earth moving machineries during a time interval. An alarm is provided to an operator in real time when the current work state reaches limit of the ELV.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In an earth moving machinery having an operation seat in an interior of an operation cab installed at an upper frame of a lower running body, the apparatus for monitoring an operator vibration for an earth moving machinery with an operation cab, comprising:

an operation seat which is installed in an interior of the operation cab and which includes an accelerometer for sensing and converting acceleration into a 3-axis channel vibration signal;

a vibration measuring device which is installed in a lower side of the operation seat and which measures a 3-axis vibration in real time by receiving the 3-axis channel signal and outputs an 3-axis vibration value based on the measured vibration;

an electronic control unit which is installed between the operation seat and the vibration measuring device and which computes a mean vibration value and an impact vibration value generated in a predetermined time interval by receiving the 3-axis vibration value and outputs vibrations of ELV(Exposure Limit Value); and a display device which is installed in an interior of the operation cab and which displays the ELV on a LCD screen in real time, so that an operator easily monitors the ELV through the LCD screen.

2. The apparatus of claim 1, further comprising an alarm device for providing an operator of an alarm when a control signal received from the electronic control unit exceeds a predetermined set ELV limit.

* * * * *